(12) United States Patent
Ono et al.

(10) Patent No.: US 6,615,963 B2
(45) Date of Patent: Sep. 9, 2003

(54) WORKING VEHICLE

(75) Inventors: Hiroyuki Ono, Tokyo (JP); Yasuhiko Miyamoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/954,857

(22) Filed: Sep. 17, 2001

(65) Prior Publication Data

US 2002/0033298 A1 Mar. 21, 2002

(30) Foreign Application Priority Data

Sep. 18, 2000  (JP) ........................................ 2000-282709
Sep. 18, 2000  (JP) ........................................ 2000-282710
Sep. 18, 2000  (JP) ........................................ 2000-282712
Sep. 13, 2001  (JP) ........................................ 2001-278098

(51) Int. Cl.⁷ ............................................. F16H 59/00
(52) U.S. Cl. ...................... 192/3.63; 74/15.63; 180/53.8
(58) Field of Search .......................... 74/15.63, 15.66; 192/3.28, 3.51, 3.63, 3.57, 3.61; 180/53.2, 53.7, 53.8, 373

(56) References Cited

U.S. PATENT DOCUMENTS

| 4,658,943 A | * | 4/1987 | Nishikawa et al. ............ 477/36 |
| 5,562,173 A | * | 10/1996 | Olson ........................ 180/53.4 |
| 5,611,751 A | * | 3/1997 | Ehrenhardt et al. ............ 477/73 |
| 5,860,499 A | * | 1/1999 | Onimaru et al. .............. 192/3.3 |
| 5,971,888 A | * | 10/1999 | Goode ......................... 477/107 |
| 6,186,925 B1 | * | 2/2001 | Bellinger ..................... 477/175 |
| 6,267,189 B1 | * | 7/2001 | Nielsen et al. .............. 180/53.1 |
| 6,308,124 B1 | * | 10/2001 | Kresse et al. .................. 701/53 |

FOREIGN PATENT DOCUMENTS

JP  2000-145906  5/2000

* cited by examiner

Primary Examiner—Saul Rodriguez
(74) Attorney, Agent, or Firm—Darby & Darby (57) ABSTRACT

A working vehicle is provided which can be smoothly started with a large driving force, and uniformly conducts a various types of works even if a travel speed varies. A working machine such as a working pump, which is also driven by an engine for driving the vehicle, is mounted on the working vehicle. The power is transmitted from a crank shaft of the engine to wheels through a torque converter provided with a lock-up clutch and an automatic transmission. The crank shaft is also connected to a driving unit for driving the working pump through gears. A transmission ratio of the automatic transmission is set to a predetermined value corresponding with work modes J1-J6. In such a way, the work modes J1-J6 are set according to characteristics of the work, in which there exists a predetermined relationship between a work amount and a vehicle speed. Therefore, fertilizer, sand, and chemicals can be appropriately and uniformly spread through a changeover of the modes.

6 Claims, 11 Drawing Sheets

FIG.11 b

WORKING VEHICLE

BACKGROUND OF THE INVENTION

The present invention relates to a working vehicle suitable for a turf grass management working vehicle used for work such as fertilizing, chemicals spraying, lawn mowing, and the like in golf courses.

In the golf courses and parks, the working vehicle, also called turf grass management working vehicle, is used to grow turf grass. With such vehicles, various types of works such as the fertilizing, spreading topdressing, the spraying chemicals, aerating soil by injecting air, or clearing tree leaves by using a blower are conducted. The various types of works are carried out with attachments, appropriate for the types of works, mounted on a bed of the working vehicle.

In the case that a manual transmission is mounted on the working vehicle, the vehicle may be suddenly started due to an operator's mistake upon a clutch operation, wherein wheels may become a situation of idle running to tear out turf grass. In particular, with a development of the working vehicle, it is desired not to damage the turf grass by an operation of the working vehicle since a total weight of a liquid tank reaches around 2000 kg when the tank is filled up for spraying the chemicals.

On the other hand, a technical development has occurred in which a working engine for driving a working machine which conducts each work is not mounted on the working vehicle, but an engine for driving the working vehicle drives also the working machine. For example, a working vehicle as shown in the Japanese Patent Application Publication No. 2000-145906 supplies actuating fluid as discharged from two hydraulic pumps, i.e., one hydraulic pump driven by a crank shaft of the engine and by a propeller shaft, to a hydraulic motor, thereby operating a scraper for conducting the various types of works.

In the case that the working vehicle sprays fertilizer, soil and sand, and chemicals to the turf grass, it is difficult to spray the objects such as chemicals with a uniform spray density per unit area if the spraying is carried out independently of the working vehicle speed or no constant vehicle speed is kept. That is to say, if the vehicle speed is varied under such a condition, the spraying amount per the unit area will not be uniform. Thus, caused is a bad situation that the spraying amount changes every working area.

Furthermore, there is a problem that each spraying amount per the unit area is different from that of the other soil/sand and chemicals spraying. In other words, a multi-purpose working vehicle has to take a relationship between the vehicle speed of the working vehicle and characteristics of the working machine in accordance with work content thereof. That is to say, the uniform spraying work requires to take into consideration of the change of spraying amount every work content as well as that depending on the vehicle speed.

SUMMARY OF THE INVENTION

An object of the present invention is to provide a working vehicle, which uses an engine for traveling as a power source of a working machine also, enabling various types of works to be uniformly and adequately carried out even if vehicle speed is varied as well as a smooth starting of vehicle.

The working vehicle according to the present invention has a working machine and comprises an engine, a power transmitting mechanism including an automatic transmission for transmitting a power of the engine to wheels, a drive unit connected to the engine for driving the working machine, and a control unit for controlling a transmission ratio of the automatic transmission so as to enable a rotational speed of the drive unit to change in synchronization with a vehicle speed when operating the working vehicle.

Furthermore, the working vehicle according to the present invention is characterized in that the power transmitting mechanism is provided with a torque converter connecting the engine to the automatic transmission.

In addition, the working vehicle according to the present invention is characterized in that the torque converter is provided with a lock-up clutch, and the control unit causes the lock-up clutch to be engaged when operating the working machine during traveling of the working vehicle over a predetermined travel speed.

According to these aspects of the present invention, the torque converter is operated between a starting speed and a predetermined travel speed to obtain a large driving force and absorb a rotational difference between the engine and the automatic transmission, so that a smooth starting of vehicle becomes possible. As a result, it can be prevented that wheels tear out turf grass due to an idle running of the wheels, so that the turf grass is not damaged by the operation of the working vehicle. Also, the control unit causes the lock-up clutch to be engaged when operating the working machine during traveling of the working vehicle with a predetermined travel speed or above, so that slipping of the torque converter can be prevented.

Furthermore, the working vehicle according to the present invention is characterized in that the working vehicle is provided with a plurality of work modes, and the control unit controls the automatic transmission based on a relationship between the rotational speed of the drive unit and the vehicle speed, wherein the relationship corresponds with any work mode selected from the plurality of ones.

According to these aspects of the present invention, if the work mode is appropriately selected in accordance with the work content, the transmission ratio of the automatic transmission can be set in such a way that there is a predetermined interrelationship between the work amount and the vehicle speed. Therefore, the working vehicle can be driven corresponding with the vehicle speed in accordance with the work content, that is, the fertilizer, sand, and chemicals can be uniformly spread. In a word, the present invention enables the working vehicle to easily deal with a various type of works by one machine through changing the work mode.

In addition, the working vehicle according to the present invention is characterized in that the automatic transmission is a continuously variable transmission comprising a primary pulley for inputting a rotational speed of the engine, a secondary pulley for outputting the rotation to the wheels, and a belt for connecting between the primary pulley and the secondary pulley.

Thereby, a shift control can be smoothly and steplessly conducted.

Also, the working vehicle according to the present invention is characterized in that the control unit controls the transmission ratio of the automatic transmission so as to enable the rotational speed of the drive unit to be substantially proportional to a change of the vehicle speed in at least predetermined range of the vehicle speed.

BRIEF DESCRIPTION OF THE DRAWINGS

These and other objects and advantages of the present invention will become clearly understood from the following description with reference to the accompanying drawings, wherein:

FIG. 11a is a shift characteristic diagram showing the relationship between the engine speed and the vehicle speed in a modified example of work modes of the second embodiment; and FIG. 11b is a shift characteristic diagram showing the relationship between the vehicle speed and a transmission ratio in the modified work mode of FIG. 11a.

DETAILED DESCRIPTION OF THE PREFERRED EMBODIMENTS

The first embodiment of the present invention will be described in detail below referring to the drawings.

Figure 1:
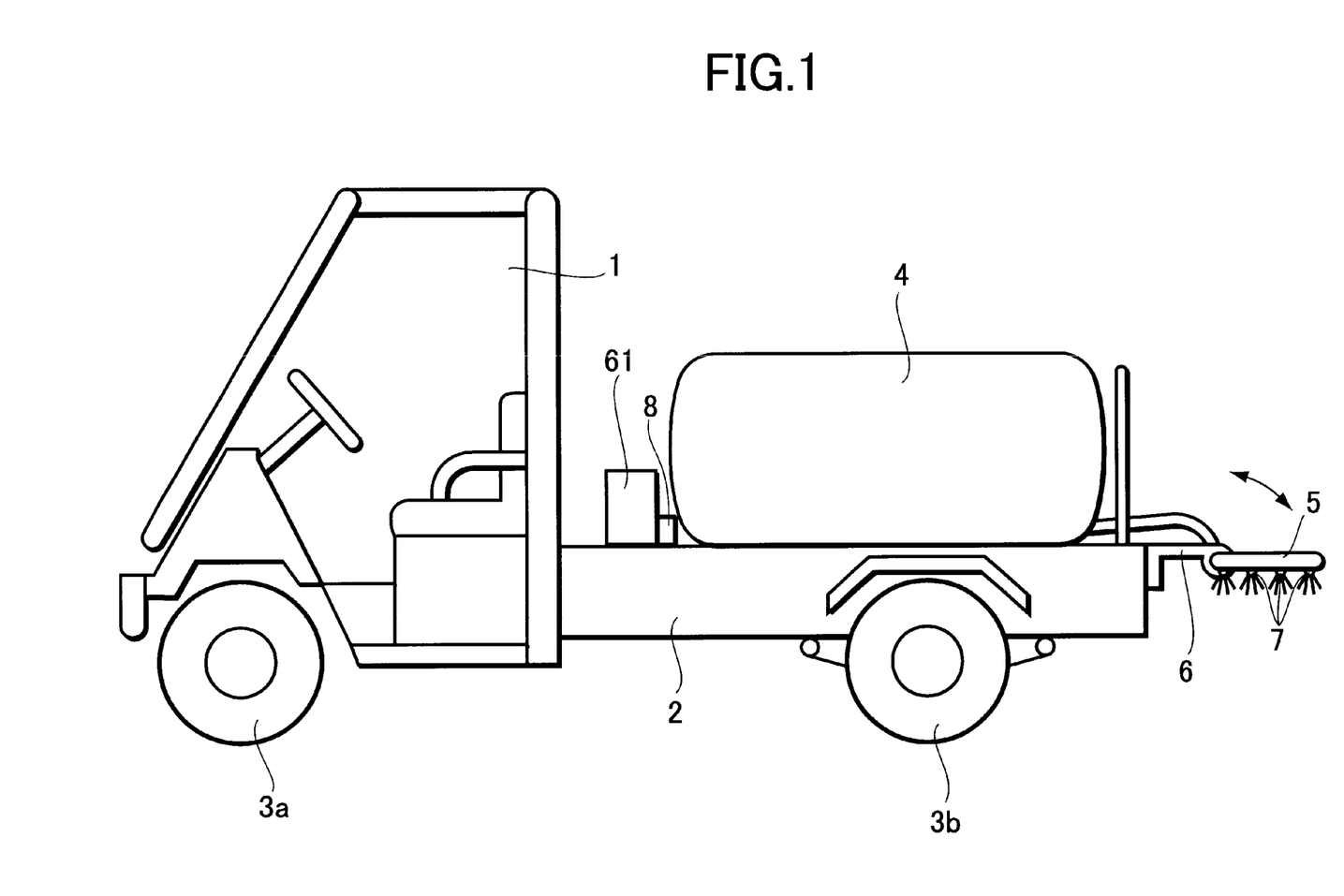
FIG. 1 is a side view showing a working vehicle of the present invention.
Figure 2:
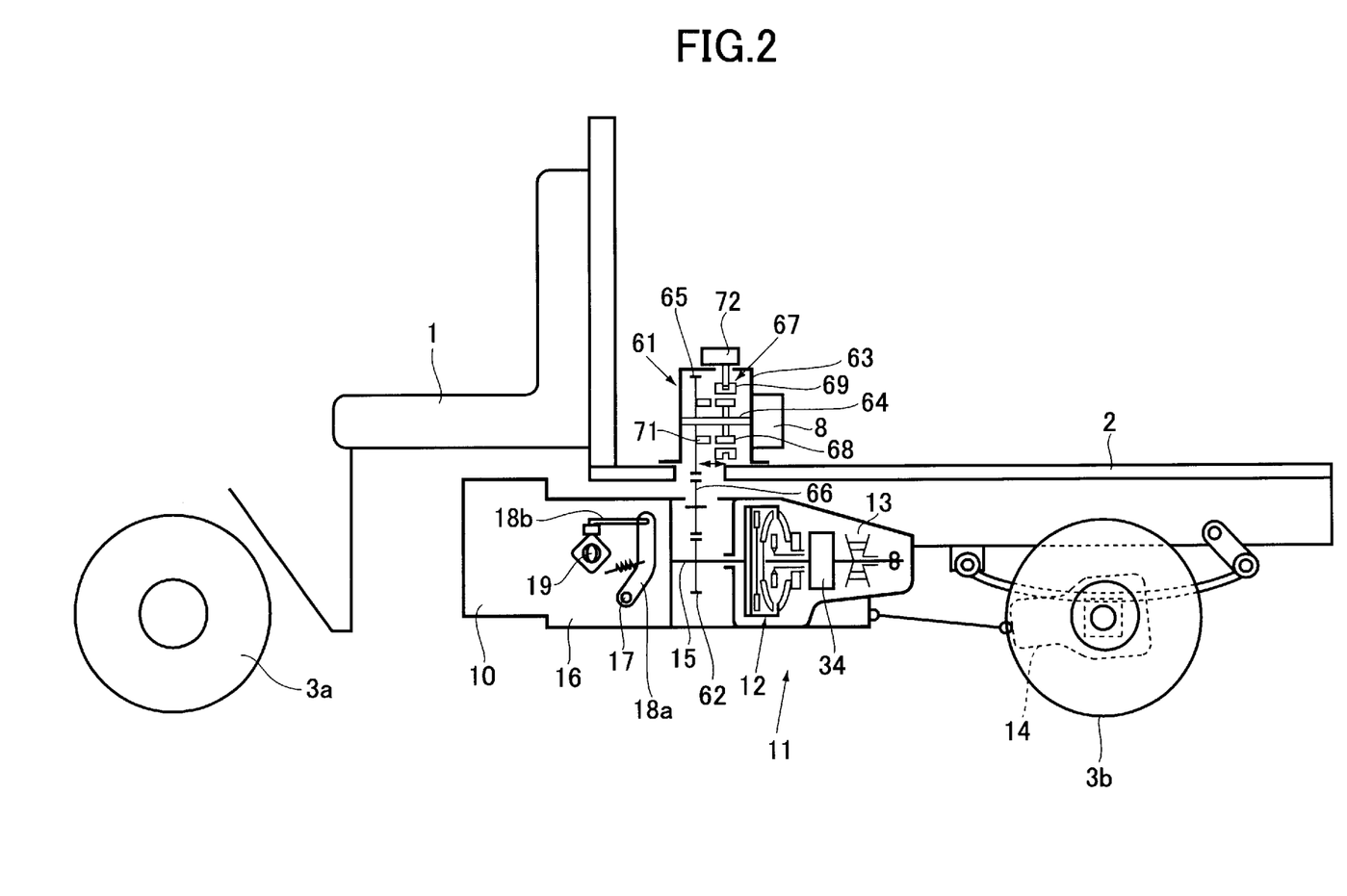
FIG. 2 is an enlarged side view showing a power transmitting flow of the working vehicle in FIG. 1.
Figure 3:
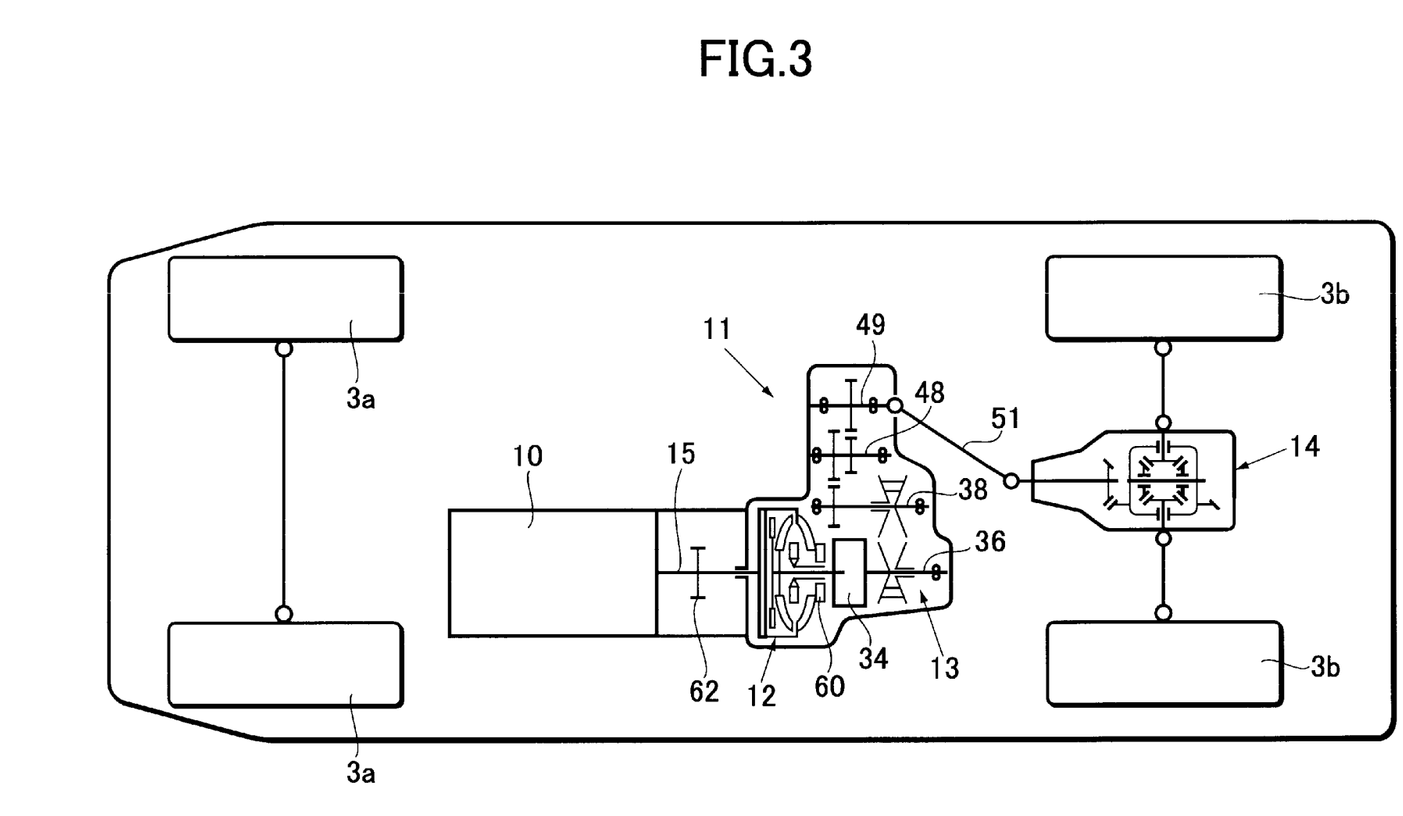
FIG. 3 is a plan view showing the power transmitting flow of the working vehicle in FIG. 1.

FIG. 1 is a side view of a working vehicle of an embodiment of the present invention, FIG. 2 is an enlarged side view showing a power transmitting flow line of the working vehicle in FIG. 1, and FIG. 3 is a plan view showing the power transmitting flow line in FIG. 2.

The working vehicle is provided with an operator's seat 1 in a front part and a bed 2 in a rear part, and a pair of front wheels 3a and a pair of rear wheels 3b are provided. It is so arranged that any of a plurality of attachments can be detachably mounted on the bed 2 depending on the kind of works. FIG. 1 shows a state in which a chemical tank 4 is mounted on the bed 2 for spraying chemicals over turf grass of a golf course.

A spray pipe 5 is fitted to the bed 2 by a holder 6. The spray pipe 5 is rotatable, with respect to the holder 6, as indicated by the arrows, and the spray pipe can either be positioned horizontally, as shown, or in a folded state. A plurality of spray nozzles 7 are provided on the spray pipe 5, and the chemicals in the chemical tank 4 are sprayed from the spray nozzles 7 by driving a working pump 8.

When spraying grainy fertilizers over the turf grass of the golf course by the working vehicle, a scraper with a hopper filled with the fertilizer is fitted to the bed 2, and when spreading soil and sand or topdressing, put into the hopper. When the fertilizer or soil and sand in the hopper is to be spread by the scraper, a hydraulic pump is installed as the pump 8, and a spreading device provided on the scraper is driven by a hydraulic motor with hydraulic oil discharged from the hydraulic pump.

When working at a high position by the working vehicle, a lifter driven by the hydraulic motor is fitted on the bed 2. Also, when pumping air into the soil to activate the turf grass, aerating nozzles for discharging compressed air supplied from an air pump are fitted on the bed 2. Furthermore, when smoothing off the soil and sand spread over the ground, a rake which is oscillated by the hydraulic motor is fitted on the bed 2.

As shown in FIG. 2 and FIG. 3, for driving the working vehicle, power from an engine 10 is transmitted to drive wheels through a power transmitting mechanism 11. The power transmitting mechanism 11 has a torque converter 12, an automatic transmission 13, and a differential device 14.

As shown in FIG. 3, because the working vehicle has the rear wheels 3b as drive wheels, the differential device 14 is provided at the rear wheel. However, the front wheels 3a or both the front and rear wheels 3a, 3b can be the drive wheels. Since both the front wheels 3a and the rear wheels 3b are for a working vehicle designed for the off-road use which can travel on the turf grass, the aforementioned wheels are wider in width than ordinary wheels.

The engine 10 is provided with a well-known mechanical type engine governor device as an engine speed regulating mechanism for constantly regulating the engine speed without being influenced by load fluctuations. As shown in FIG. 2, a governor shaft 17 of the engine governor device is provided in a crank case 16 having a crank shaft 15, which is rotated through a reciprocating movement of a piston, therein. The governor shaft 17 is connected to a throttle valve 19 through a governor lever 18a and a governor rod 18b. In general, when an engine load is lowered, the engine speed has a tendency to be temporally increased by the lowered amount of load. However, since the engine 10 of the present application is provided with the governor device, the governor lever 18a is rotated in a direction of a lower speed side thereof to close the throttle valve 19 if the engine load is lowered. Therefore, the engine speed can be constantly regulated without being influenced by the load fluctuations.

Figure 4:
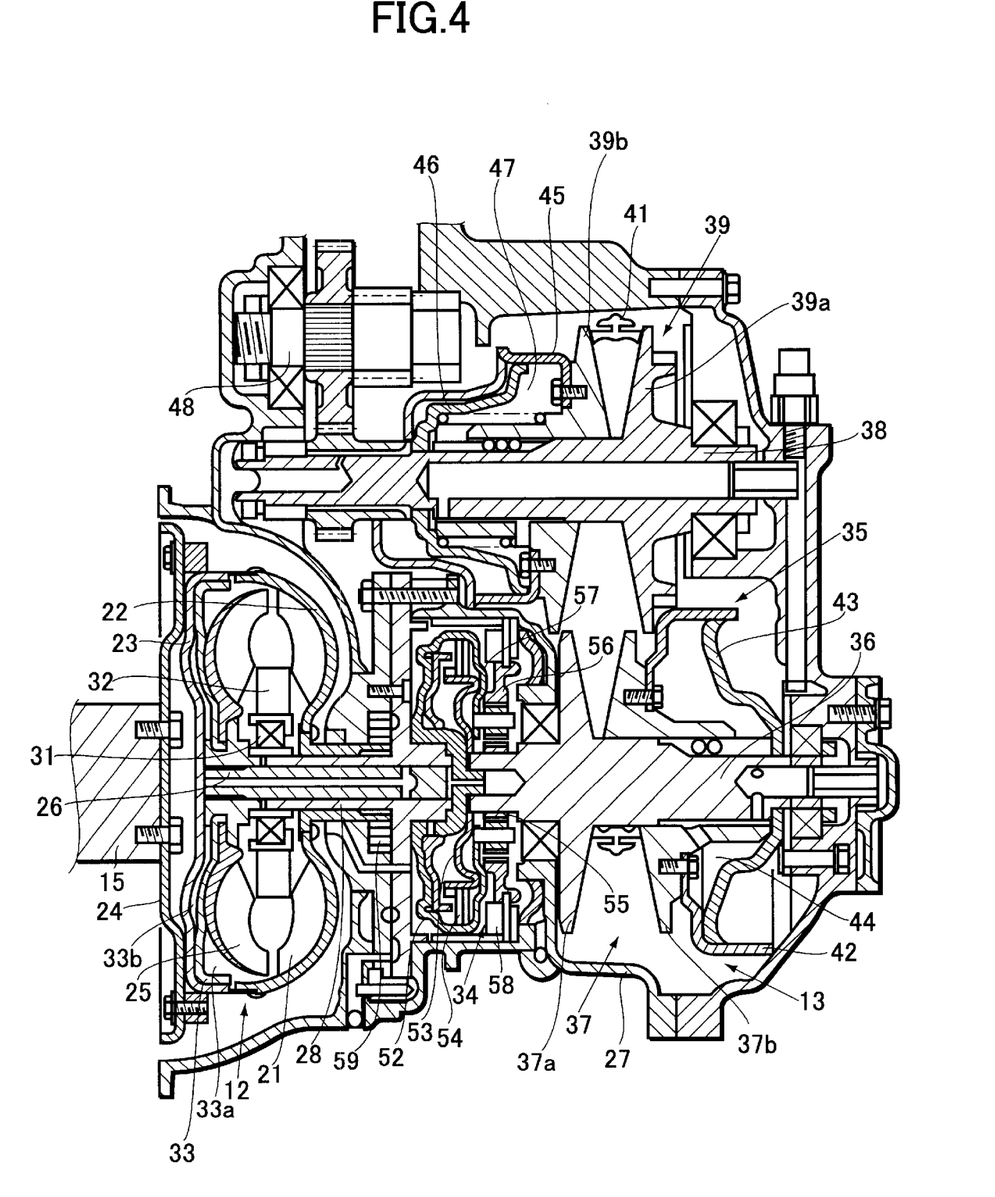
FIG. 4 is an enlarged cross sectional view showing a torque converter and an automatic transmission.

FIG. 4 is an enlarged sectional view showing the torque converter 12 and the automatic transmission 13. The torque converter 12 is connected to the crankshaft 15 of the engine 10. The torque converter 12 has a pump-side case 22 provided with a pump impeller 21 and a front cover 23 fixed to the pump-side case 22. The front cover 23 is fixed to the crankshaft 15 through a drive plate 24. A turbine runner 25, arranged facing the pump impeller 21, is fixed to a turbine shaft 26, and the turbine shaft 26 is rotatably putted in a hollow supporting shaft 28 which is fixed to a transmission case 27. On the supporting shaft 28, a stator 32 is mounted through a one-way clutch 31.

A lock-up clutch 33 is fitted to the turbine shaft 26 and engaged with the front cover 23. On one side of the lock-up clutch 33 is an application chamber 33a and on the other side thereof is a release chamber 33b. Therefore, the torque converter 12 is operated by the hydraulic oil supplied to the release chamber 33b circulated through the application chamber 33a, and the torque converter 12 proceeds to a lock-up state when the pressure in the release chamber 33b is lowered by supplying hydraulic oil to the application chamber 33a and thereby the lock-up clutch 33 is connected to the front cover 23. Thus the power of the crankshaft 15 is transmitted to the turbine shaft 26 through the torque converter 12 or the lock-up clutch 33.

The automatic transmission 13 is a continuously variable transmission, in which the rotation of the turbine shaft 26 is transmitted to a primary shaft 36 of a continuously variable transmission 35 through a forward-reverse changeover device 34. The primary shaft 36 is provided with a primary pulley 37, which has a fixed pulley 37a integrally formed with the primary shaft 36, and a movable pulley 37b mounted on the primary shaft 36 in such a way that it can axially slide through a ball spline. The movable pulley 37b is positioned facing the fixed pulley 37a. The width of the groove between the pulleys is variable. A secondary shaft 38 arranged parallel to the primary shaft 36 is provided with a secondary pulley 39, which has a fixed pulley 39a integrally formed with the secondary shaft 38 and a movable pulley 39b mounted, in the same way as the movable pulley 37b, on the secondary shaft 38 facing the fixed pulley 39a so that it can axially slide. The width of the groove between the pulleys is variable as well as that of the primary shaft 36.

A belt 41 is arranged between the primary pulley 37 and the secondary pulley 39. The rotational speed of the secondary shaft 38 can be steplessly varied by making the radii of the belt 41 on the pulleys 37 and 39 vary through the variation of the widths between both the pulleys 37 and 39. In FIG. 4, both narrowed and widened states of each groove width of the pulleys 37 and 39 are shown.

A primary oil chamber 44 is formed with a cylinder 42 By fixed to the movable pulley 37b and a plunger 43 fixed to the primary shaft 36. A secondary oil chamber 47 is formed with a cylinder 45 fixed to the movable pulley 39b and a plunger 46 fixed to the secondary shaft 38. Each pulley-groove width is varied by adjusting a hydraulic pressure supplied to each of the oil chambers 44 and 47.

As shown in FIG. 3, the secondary shaft 38 is connected to a first and second intermediate shafts 48 and 49 through gears. The intermediate shaft 49 is connected to the differential device 14 through a connecting shaft 51.

As shown in FIG. 4, the forward-reverse changeover device 34 has a clutch drum 52 fixed to the turbine shaft 26 and a clutch hub 53 fixed to the primary shaft 36. A multi-disk type forward clutch 54 is provided between the clutch drum 52 and the clutch hub 53. Therefore, when the forward clutch 54 is connected, the rotation of the turbine shaft 26 is transmitted to the primary shaft 36 through the clutch hub 53, and the primary shaft 36 rotates in a positive rotational direction, the same direction as that of the turbine shaft 26.

A sun gear 55 is fixed to the primary shaft 36, and on an outer periphery of the sun gear 55, a ring gear 56 is rotatably arranged. Planetary pinion gears are rotatably mounted on a carrier 57 fitted to the clutch drum 52, one of planetary pinion gears meshes with the sun gear 55 and the other meshes with internal teeth of the ring gear 56. A multi-disk type reverse brake 58 is provided between the ring gear 56 and the transmission case 27, and the sun gear 55 and the primary shaft 36 rotate in the opposite direction to the turbine shaft 26 when the reverse brake 58 is putted in a braking state with the forward clutch 54 disengaged.

A hydraulic pump 59 mounted on the transmission case 27 is driven with the engine 10 through the crankshaft 15 and a pump-side case. It is so arranged that the hydraulic oil discharged from the hydraulic pump 59 is supplied to hydraulic equipments provided on the continuously variable transmission 35.

Chemicals in the chemical tank 4 mounted on the bed 2 are to be supplied to the spray nozzles 7 by the working pump 8. As shown in FIG. 2, the working pump 8 is driven with a drive unit 61 mounted on the bed 2.

As shown in FIG. 2, a gear 62 is fitted on the crankshaft 15. A gear 65 is fixed on a working shaft 64, which is rotatably mounted within a unit case 63 of the drive unit 61, and meshes with the gear 62 through an intermediate gear 66. Thus, it is so arranged that the working shaft 64 is driven with the engine 10 which drives the working vehicle. The gears 62, 65, and 66 are provided to transmit the rotation of the crankshaft 15 to the working shaft 64, but it may be arranged in such a way that the power is transmitted through a chain or a belt.

A changeover clutch 67 for changing over between the states at which the working shaft 64 is connected to or disconnected from the crankshaft 15 is provided on the working shaft 64. This changeover clutch 67 has a clutch hub 68 fixed to the working shaft 64 and a clutch sleeve 69 which is axially movable on the working shaft 64 while constantly meshing with the clutch hub 68. An engaging ring 71 is fixed on the gear 65 facing the clutch sleeve 69.

A hydraulic type or electric type working actuator 72 is provided on the drive unit 61, whereby the clutch sleeve 69 is automatically operated and shifted to a state for transmitting the rotation of the crankshaft 15 to the working shaft 64 while engaging with the clutch hub 68 and the engaging ring 71, or to a state for disconnecting the power by engaging only with the clutch hub 68. In the drive unit 61 shown in FIG. 2, it is so arranged that the changeover operation between the connection of the working shaft 64 to and the disconnection thereof from the crankshaft 15 is automatically made by operating a switch at the operator's seat through the working actuator 72; however, the changeover may also be carried out manually, instead of using the working actuator, with a manual operation lever assembled with the drive unit 61.

The working pump 8 is detachably mounted on the drive unit 61, and as shown in FIG. 1, when spraying the chemicals, a liquid discharging pump is mounted on the drive unit 61 as the working pump 8, and when spreading the fertilizer or topdressing, a hydraulic pump to drive a hydraulic motor which is assembled to a scraper is mounted on the drive unit 61. Furthermore, a drive unit assembled with the working pump 8 adapted for all the kind of works may be mounted on the bed 2 without exchanging the working pump 8 depending on the kind of works.

Figure 5:
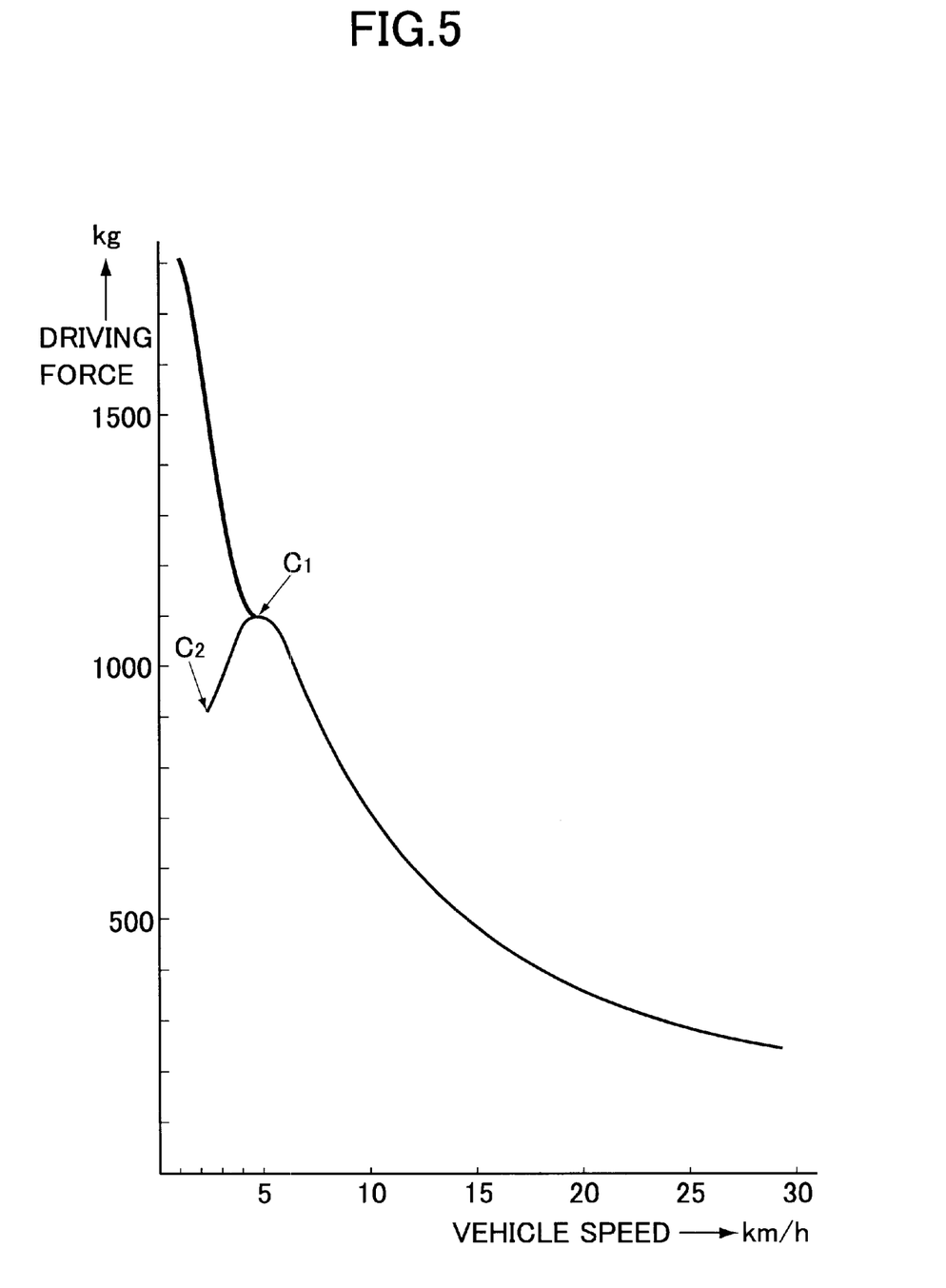
FIG. 5 is a power characteristics diagram showing a relationship between a driving force and a vehicle speed provided by an engine.

FIG. 5 is a power characteristics diagram showing relationships between the driving force of the vehicle and the vehicle speed provided by the engine 10 installed in the working vehicle. In FIG. 5, a thin line shows the driving force characteristics of the situation where the lock-up clutch 33 is engaged, and a bold line shows the driving force characteristics of the situation where the torque converter 12 is actuated after the lock-up clutch 33 is disengaged.

The driving force of the engine 10 reaches its maximum value at a vehicle speed of 4.5 km/h, which is a predetermined low travel speed C1, as shown by the thin line, and the driving force lowers even if the vehicle speed is lower than or higher than the speed shown here. However, the driving force can be increased even if the travel speed is at 4.5 km/h or below, when the torque converter 12 is actuated by disengaging the lock-up clutch 33. Therefore, from the start of a vehicle until the speed reaches the predetermined low travel speed, or a lock-up applying speed C1, the vehicle can be easily moved by actuating the torque converter 12 without causing the engine to stall or slipping the drive wheels.

When spraying the chemicals over the turf grass, the working pump 8 is driven by the drive unit 61 while the vehicle is traveling; however, when the working pump 8 is driven while the torque converter 12 is being actuated, the rotational speed of the working shaft 64 has no constant relationship with the vehicle speed. Therefore, the chemical spraying work is conducted by making the rotational speed of the working shaft 64 be in synchronization with the vehicle speed in a condition where the torque converter 12 is locked up after the vehicle has started and the lock-up applying speed C1 has been exceeded. Thereby, the rotation of the engine is transmitted with a higher response so that fuel consumption can be improved.

However, once the vehicle speed has increased up to the lock-up state, the engine stall does not occur even when the vehicle speed is lowered below the lock-up applying speed C1. Therefore, a speed which is lower than the lock-up applying speed C1 is set as a lock-up releasing speed, or a work releasing speed C2. These speeds are in the range of 2 to 3 km/h, and by setting the lock-up releasing speed C2 at a lower speed than the lock-up applying speed C1, chemicals spraying work can be conducted even when the vehicle travels at a low travel speed which is lower than the lock-up applying speed C1.

Figure 6:
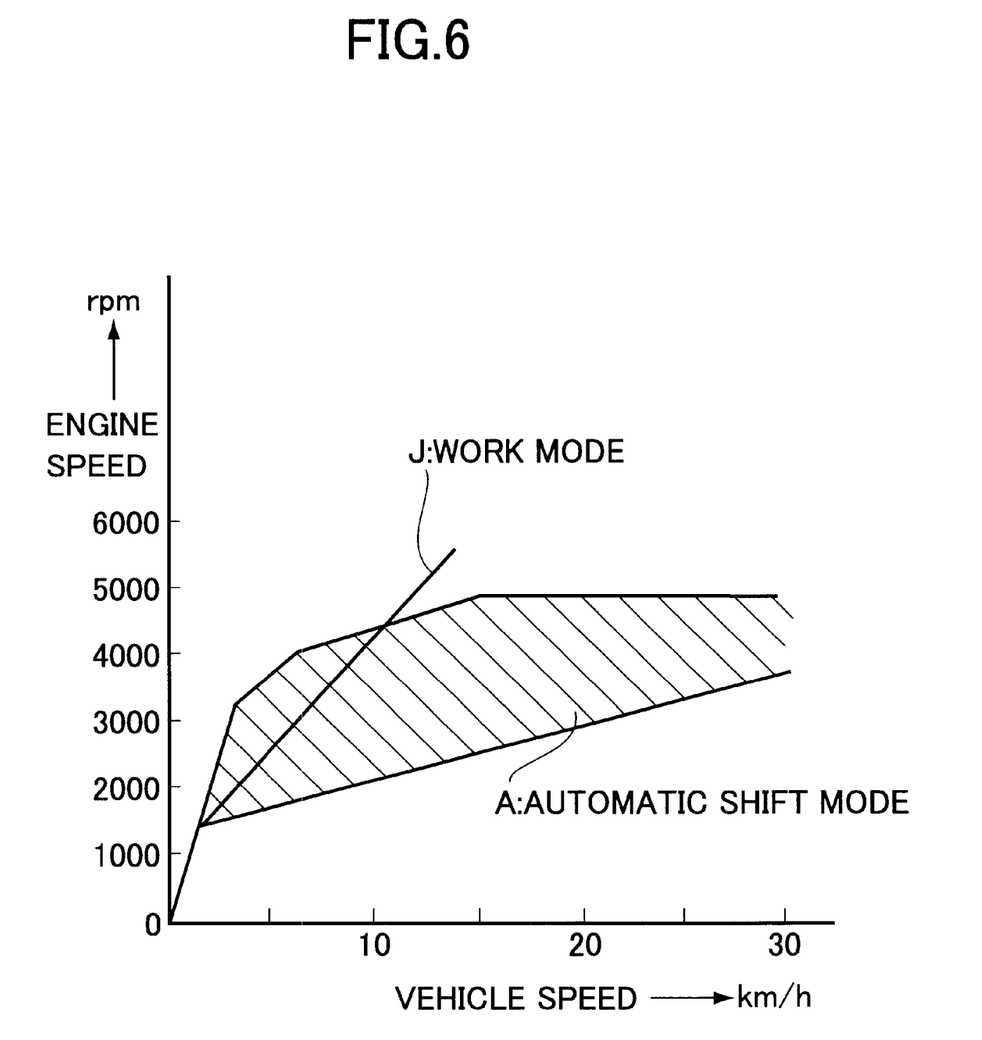
FIG. 6 is a sift characteristic diagram showing the relationship between an engine speed and the vehicle speed in the first embodiment of the present invention.

FIG. 6 is a shift characteristic diagram showing the relationship between the engine speed and the travel speed of the working vehicle with the continuously variable transmission 35. The continuously variable transmission 35 freely changes a transmission ratio in an automatic shift mode A which lies within the hatched area between a low speed stage at which the radius of the belt on the primary pulley 37 is at a minimum and a high speed stage at which the radius of the belt on the primary pulley 37 is at a maximum. Therefore, in the automatic shift mode A, a transmission ratio, or a pulley ratio, is automatically set at any value depending on the traveling condition of the vehicle, and so the traveling of the working vehicle being not in a spraying work state can be made at the most appropriate transmission ratio.

However, in the automatic shift mode A, the continuously variable transmission 35 voluntarily changes speeds depending on the throttle opening, the engine speed, and the vehicle speed, and thus the relationship between the engine speed, namely the spraying amount by the working vehicle, and the vehicle speed is not in a proportional relationship, so that a work such as chemical spraying cannot be uniformly carried out in the automatic shift mode A while the vehicle speed is being changed.

Then, in order to lead a constant efficiency in the relationship with the vehicle speed in, for example, chemical spraying work conducted by driving the working shaft 64, it is necessary to set the work mode so as to enable the rotational speed of the working shaft 64 in a working range thereof to proportionally change in the relationship with the change of the vehicle speed as shown with the symbol J in FIG. 6. A change-speed line of the work mode J is set so as to enable the working vehicle to travel with a transmission ratio of the lowest stage until the vehicle speed thereof reaches a predetermined vehicle speed of the low speed range, and is set as a linear function having a predetermined slope, which represents a relationship between the rotational speed of the working shaft 64 (engine speed) and the vehicle speed, in the range over the predetermined vehicle speed, wherein the efficiency of each type of the works can be constantly kept at the most adequate value or required value in the relationship with the change of the vehicle speed. Thereby, the rotational speed of the working shaft 64 changes in synchronization with the vehicle speed, so that, in the work of, for example, chemical spraying, the chemicals can be sprayed with a uniform spraying density per unit area even if the vehicle speed varies.

Moreover, the transmission ratio i is represented with a ratio between rotational speed Np of the primary shaft and rotational speed Ns of the secondary shaft (i=Np/Ns). When the torque converter 12 is locked up, the rotational speed Np of the primary shaft may be regarded to be the same as the engine speed Ne. In this case, the rotational speed Ns of the secondary shaft is represented as a function of the vehicle speed V (Ns=V/K, K=πd/S; wherein d is a diameter of tire, and S is a reduction ratio between the continuously variable transmission 35 and the driving wheels). As a result, the transmission ratio i is represented as a function between the engine speed Ne and the vehicle speed V (i=K·Ne/V), and thus the continuously variable transmission 35 is controlled with the transmission ratio i for accomplishing the relationship between the engine speed Ne and the vehicle speed V in the work mode J. In such a way, the transmission ratio i is fixed to the lowest stage until the predetermined vehicle speed, and is inversely proportional against the vehicle speed V in the range over the predetermined vehicle speed.

Moreover, as mentioned above, the engine 10 is provided with the engine governor device. Therefore, when the engine speed reaches a predetermined value through the accelerator operation of the operator, the vehicle speed and the rotational speed of working shaft 64 is kept at a value determined by the engine speed to conduct the work.

Figure 7:
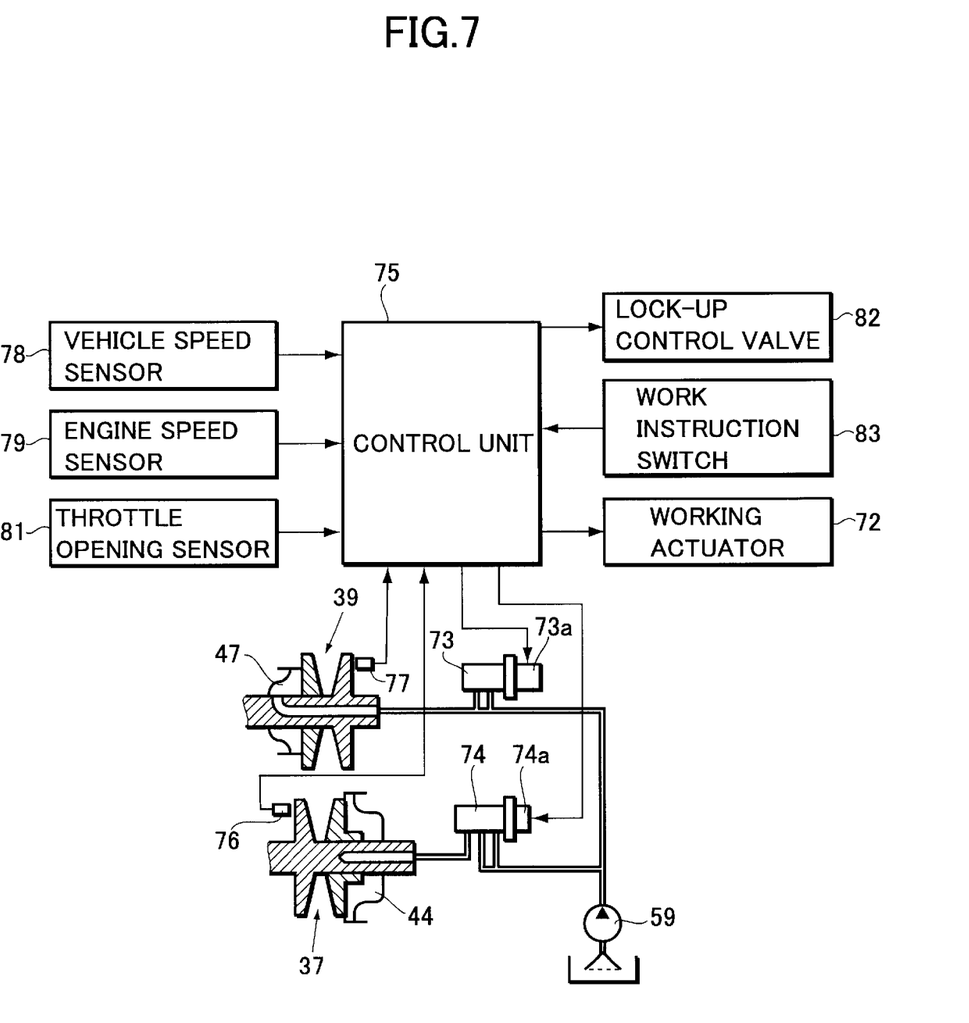
FIG. 7 is a block diagram showing a shift control circuit in the first embodiment.

FIG. 7 is a block diagram showing a shift control circuit of the continuously variable transmission 35. The continuously variable transmission 35 is controlled by a control unit 75 which functions also as a transmission controller unit (TCU). As shown in FIG. 7, the discharge port of the hydraulic pump 59 driven by the crankshaft 15 is connected to a line pressure control valve 73 and a shift control valve 74. Discharge pressure from the hydraulic pump 59 is adjusted to a line pressure by the line pressure control valve 73, and the adjusted line pressure is supplied into a secondary oil chamber 47 as a secondary hydraulic pressure. The shift control valve 74 supplies a primary hydraulic pressure, obtained by adjusting the line pressure, into a primary oil chamber 44 to adjust the groove width of the primary pulley 37 so as to control the transmission ratio. On the other hand, an adequate tension according to the operating conditions is applied to the belt 41 by a secondary hydraulic pressure supplied into the secondary oil chamber 47.

Detection signals are sent to the control unit 75 from a primary pulley rotational speed sensor 76 for detecting the rotational speed of the primary pulley 37, and from a secondary pulley rotational speed sensor 77 for detecting the rotational speed of the secondary pulley 39. Furthermore, detection signals from a vehicle speed sensor 78, an engine speed sensor 79, and a throttle opening sensor 81 are sent to the control unit 75, and also from the control unit 75 a changeover signal is sent to a lock-up control valve 82 for changing over the lock-up clutch 33 of the torque converter 12 between the lock-up engaged state and the lock-up disengaged state.

In addition, the control unit 75 is provided with memories such as ROMs for storing data for the transmission ratios based on the travel conditions such as the vehicle speed in the automatic shift mode A, and the data for the transmission ratios in the work mode J, and also the memories such as RAMs for temporarily storing the variables necessary for executing a program. Furthermore, the control unit 75 is provided with a CPU for computing control signals of the transmission based on the detected signals from each sensor.

Accordingly, the vehicle travels at the automatic shift mode A when the work such as the chemical spraying is not carried out. In other words, a voluntary transmission ratio within an area hatched in FIG. 6 is set without the steps according to signals from the vehicle speed sensor 78. Also, during the traveling state, the lock-up clutch 33 is automatically changed over based on the vehicle speed.

When the chemical spraying is carried out with the working pump 8 driven by the working shaft 64, the changeover clutch 67 is set to a connection state by actuating the working actuator 72. For this purpose, a work instruction switch 83 for operating the working actuator 72 is provided at the operator's seat, and it is so arranged that a signal from the work instruction switch 83 is transmitted to the control unit 75.

Therefore, when the operator operates the work instruction switch 83 to start chemical spraying work while the vehicle is stopping or traveling, the signal is transmitted to the working actuator 72 to operate the changeover clutch 67. Thereby, the working shaft 64 is connected to the crank shaft 15 to drive the working pump 8. On the other hand, the shift characteristics of the continuously variable transmission 35 is set to the work mode J in FIG. 6, wherein the transmission ratio is set along the predetermined change-speed line, in other words, so as to enable the engine speed to proportionally change with the vehicle speed in order to drive the working vehicle.

In this work mode J, the rotational speed of the working pump 8 is in synchronization with the rotational speed of the engine 10, and the vehicle speed is varied proportionally to the engine speed. Accordingly, the amount of the chemical spraying can be constantly kept per the unit area in the working area even if the vehicle speed varies according to the accelerator operation of the operator.

When the vehicle speed is at or below the work releasing speed C2 during the spraying work, a control signal is sent to the working actuator 72, and the connection between the working shaft 64 and the crankshaft 15 is disconnected by the changeover clutch 67 to stop the operation of the working pump 8. By providing at the operator's seat an indicator lamp which indicates whether the working pump 8 is in the operating state or in the non-operating state, the operator can visually discern the state of the working pump 8.

Next, the second embodiment of the present invention will be explained with reference to FIGS. 8 to 11. The working vehicle of the present embodiment is provided with a plurality of the work modes as indicated by symbols J1 to J6 in FIG. 8 in order to conduct various kinds of work. Each subject of the work modes J1-J6 is the same as one of the first embodiment, but a plurality of modes are provided for variably set a work efficiency of a working machine against the vehicle speed according to the type of the working machine in the second embodiment.

Figure 10:
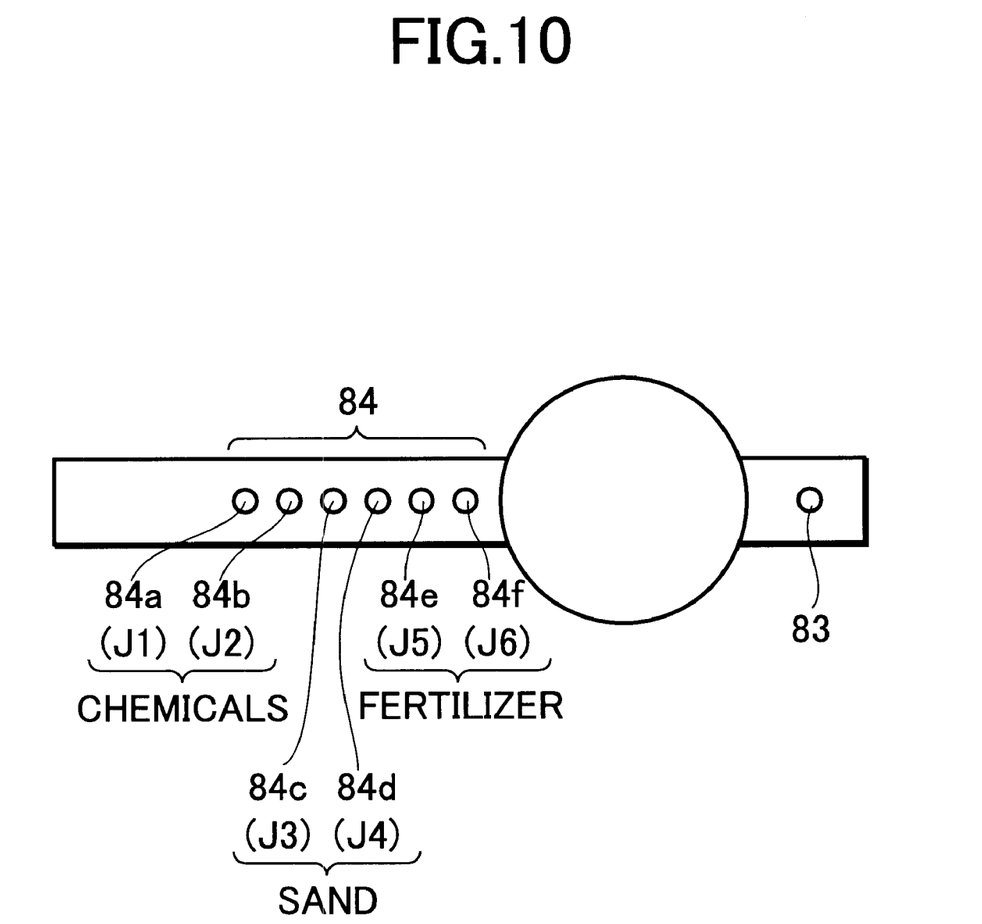
FIG. 10 is an explanatory drawing showing an arrangement at an operator's seat in the second embodiment.
Figure 11:
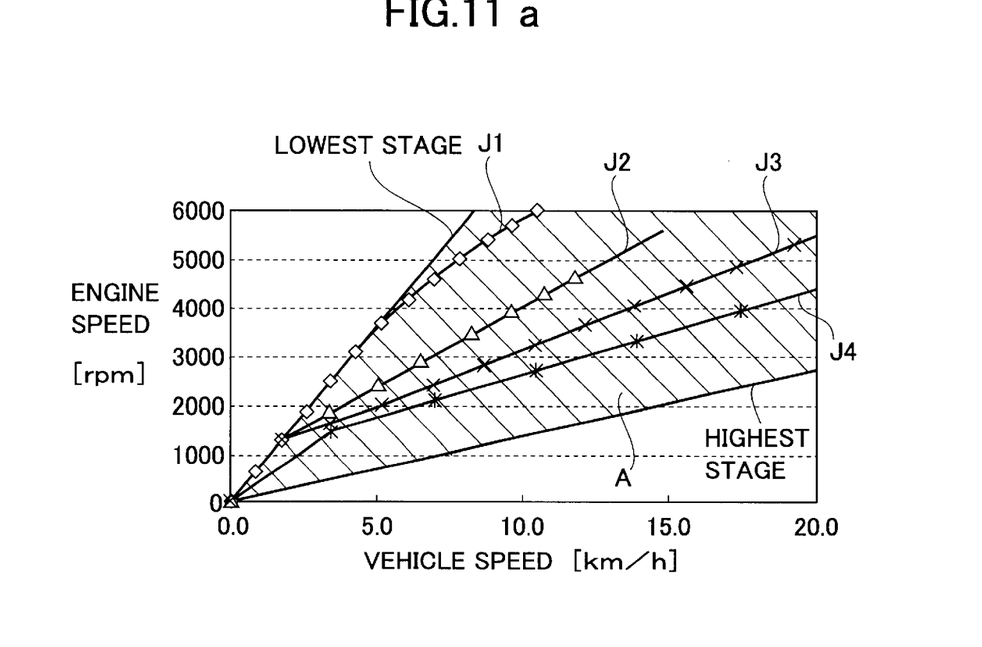

Here, six work modes are preset, namely, "chemicals spraying modes J1, J2" as a low speed range, "sand spreading modes J3, J4" as an intermediate speed range, and "fertilizer spreading modes J5, J6" as a high speed range. A changeover of these modes can be carried out by each mode selection switch 84 (84a-84f) as work mode inputting means provided at the operator's seat as shown in FIG. 10. In this case, switches 84a, 84b correspond with chemical spraying modes J1, J2, respectively. Also, switches 84c, 84d correspond with the sand spreading modes J3, J4, respectively. Further, switches 84e, 84f correspond with the fertilizer spreading modes J5, J6, respectively. Moreover, the mode selection switch 84 functions also as a mode display lamp. When the selected mode is carried out, the light of the switch is blinked on and off.

In each mode, the rotational speed of the working shaft 64, which is equal to the engine speed if locked up, and the vehicle speed is set as a linear function having a predetermined slope. Hereby, the chemicals, sand, or fertilizer can be sprayed or spread with a uniform spraying/spreading density per the unit area in spite of the variation of the vehicle speed. Furthermore, a plurality of work modes, in which the relationship between the rotational speed of the working shaft 64 and the vehicle speed, namely the slope of the linear function, is different from each other, are set taking operational characteristics of the working machine into account, thereby enabling the working vehicle to drive with the most adequate work efficiency in accordance with the content of the work through adequately selecting the work mode.

For example, the sand spreading mode J3 can obtain higher vehicle speed than the chemical spraying mode J1 under the condition of the same engine speed through changing the work mode if the both modes are compared.

Moreover, the same chemical spraying mode may be divided into two kinds of further modes since the working machine may receive different load due to viscosity of the chemicals. In the sand or fertilizer spreading mode also, this matter is applicable, thereby the adequate mode can be selected taking the load of the working machine due to the viscosity and the water content into account. Also, without naming the mode such as "chemicals", an indication such as low speed modes 1, 2, intermediate speed modes 1, 2, and high speed modes 1, 2 is also possible, wherein the operator can select the mode adequate to the work from the above modes. Hereby, a different work also can be easily and adequately carried out only with an exchange of attachments (working machine) and a changeover of the modes.

Figure 9:
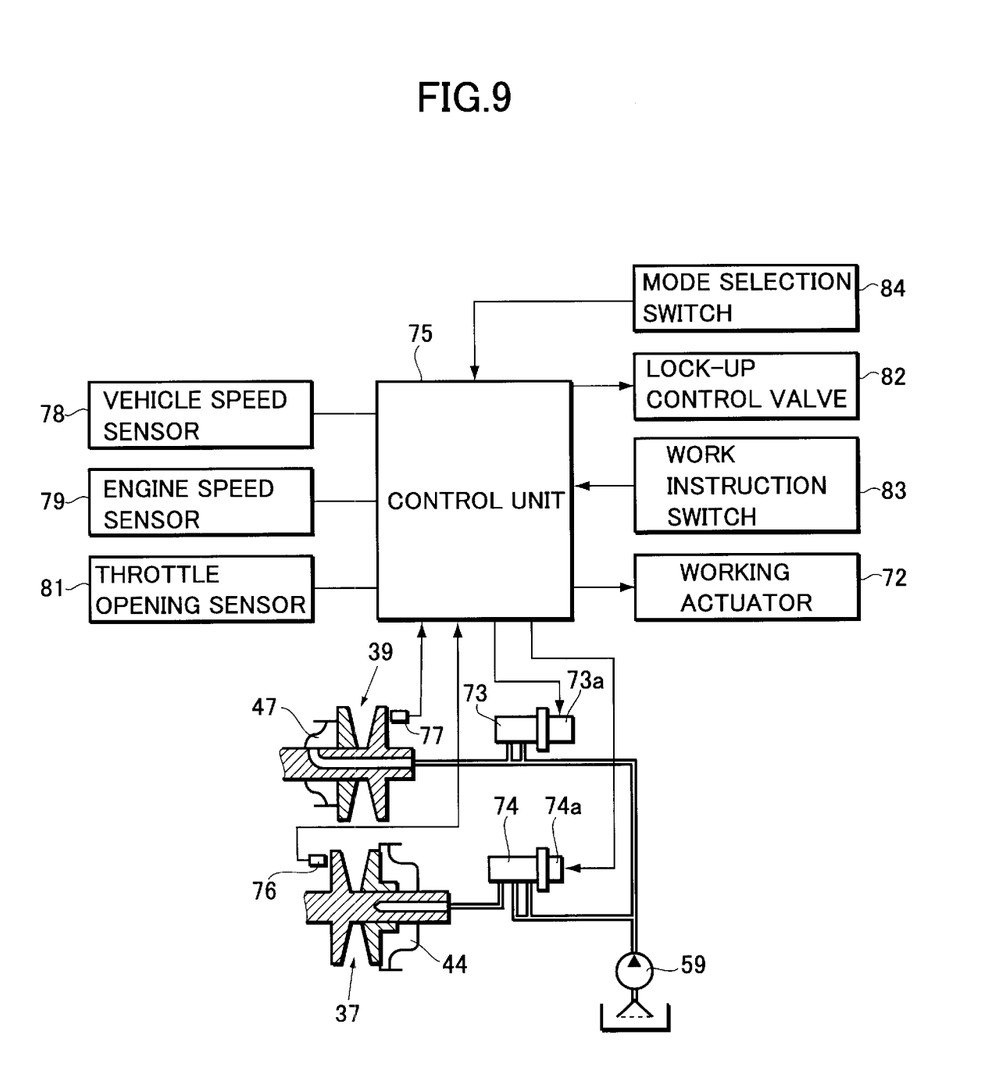
FIG. 9 is the block diagram showing a shift control circuit in the second embodiment.

FIG. 9 is a block diagram showing a shift control circuit of the continuously variable transmission 35 in the second embodiment, a structure of which is the same as one of the first embodiment other than the structure that a signal from the mode selection switch 84 is inputted to the control unit 75. Moreover, the ROM of the control unit 75 stores the data of the transmission ratios for accomplishing the relationship between the engine speed and the vehicle speed in each of the work modes J1 to J6.

Next, the operation of the working vehicle regarding the second embodiment will now be described. The vehicle travels at the automatic shift mode A when the work such as the chemical spraying is not carried out. In other words, a voluntary transmission ratio within an area hatched in FIG. 6 is set without steps according to signals from the vehicle speed sensor 78 and a traveling state thereof. Also, during this traveling condition, the lock-up clutch 33 is automatically changed over based on the vehicle speed.

When the chemical spraying is carried out with the working pump 8 driven by the working shaft 64, the changeover clutch 67 is set to the connection state by actuating the working actuator 72. For this purpose, a work instruction switch 83 for operating the working actuator 72 is provided at the operator's seat, and it is so arranged that a signal from the work instruction switch 83 is transmitted to the control unit 75.

As mentioned above, the mode selection switch 84 is provided at the operator's seat, a signal from which also is transmitted to the control unit 75 as work mode setting means. Based on the signal, any one of the work modes J1 to J6 is selected. When the work instruction switch 83 is turned ON, the transmission ratio of the continuously variable transmission 35 is controlled along the change-speed line of the selected work mode to start the work.

For example, when the operator conducts the chemical spraying work from now, firstly the operator selects "chemicals (J1)" with the mode selection switch 84a. In this case, the blinking of the mode selection switch 84a indicates that just the mode has been selected. Consequently, when the operator operates the work instruction switch 83 to start chemical spraying work while the vehicle is stopping or traveling, a signal is sent to the working actuator 72 and then the changeover clutch 67 is activated. Thereby, the working shaft 64 is connected to the crankshaft 15 to drive the working pump 8. Also, a transmission characteristic is set to that of the work mode J1, and then the vehicle is driven with a predetermined change-speed line. In this stage, the light of the mode selection switch 84a changes from a lighted state to a blinked state, and thereby indicates that the chemical spraying mode J1 is carried out.

On the other hand, when the operator conducts the fertilizer spreading work from now, firstly the operator selects "fertilizer (J3)" with the mode selection switch 84c. Hereby, as mentioned above, when the work instruction switch 83 is operated, the fertilizer spreading device is driven with the transmission characteristic set to that of the work mode J3, in which the working vehicle is driven with a predetermined change-speed line. Thus, the most adequate work mode can be selected only by only one switch operation of the operator, and thus a plurality of works can be accomplished only by one vehicle.

Although the mode selection switch 84 of the second embodiment has the construction which functions also as the mode indicating lamp, a mode indicating device may be mounted apart from the mode selection switch 84. Furthermore, it is also possible to draw an attention that any mode is now being selected to the operator through voice.

The present invention is not limited to the first and second embodiments described above, and it will be obvious to those skilled in the art that various changes and modifications may be made without departing from the spirits of the invention.

For example, the working vehicle shown in the figures is equipped with the continuously variable transmission as an automatic transmission; however, an ordinary planetary gear type automatic transmission may be used. In this case, when the working machine is not used, the transmission ratio is automatically changed over, and also when the working machine is used, the predetermined transmission ratio is selected to keep the constantly fixed transmission ratio during the operation. Moreover, in order to constantly keep the engine speed independently of the load fluctuation applied to the vehicle, the mechanical type engine governor device is provided in the above mentioned description. However, by using a fuel injection type of the engine, the engine speed may be constantly kept through controlling the injection amount of the fuel.

Figure 8:
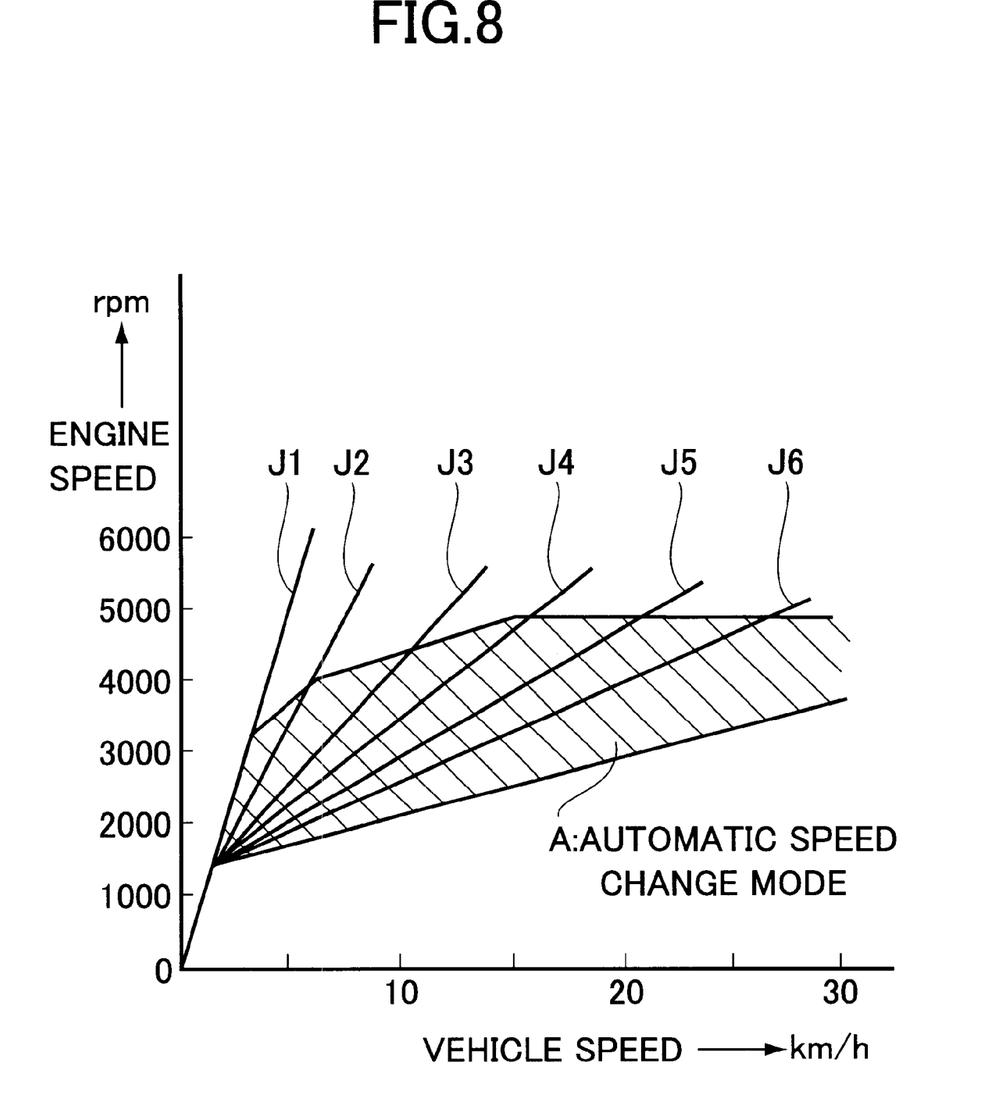
FIG. 8 is a shift characteristic diagram showing a relationship between the engine speed and the vehicle speed in the second embodiment of the present invention.

In addition, the work modes as shown in FIGS. 6 and 8 are one example, respectively, which is not limited to the shown one in the figures. For example, although FIGS. 6 and 8 show an example in which a shift characteristic is expressed with a straight line, strictly speaking, the substantially linear characteristic also may be accepted as shown with the work mode J1 of FIGS. 11a and 11b. In other words, the characteristic is not limited to the straight line.

Furthermore, in the present invention, it is sufficient that the work efficiency is constant in the speed range where the working machine is mainly operated. Namely, the shift characteristic in the other speed range is not important for the present invention, and so it is also included in the present invention as long as the work efficiency is arranged to be constant in the main speed range with the embodiment of the present invention.

On the other hand, the present invention may be applied only to a part of work modes, for example, J1 in the embodiment having a plurality of work modes.

While there have been described what are at present considered to be preferred embodiments of the present invention, as already mentioned above, it will be understood that various modifications may be made thereto, and it is intended that the appended claims cover all such modifications as fall within the true spirit and scope of the invention.

What is claimed is:

1. A working vehicle having a working machine comprising:
   an engine;
   a power transmitting mechanism including an automatic transmission for transmitting a power of said engine to wheels;
   a drive unit connected to said engine for driving the working machine; and
   a control unit for controlling a transmission ratio of said automatic transmission so as to enable a rotational speed of said drive unit to change in synchronization with a vehicle speed when said working machine is being operated.

2. The working vehicle according to claim 1, wherein said power transmitting mechanism is provided with a torque converter connecting said engine to said automatic transmission.

3. The working vehicle according to claim 2, wherein said torque converter is provided with a lock-up clutch, and
   said control unit causes said lock-up clutch to be engaged when said working machine is being operated during traveling of said working vehicle over a predetermined travel speed.

4. The working vehicle according to claim 1, wherein said working vehicle is provided with a plurality of work modes, and said control unit controls said automatic transmission based on a relationship between the rotational speed of said drive unit and the vehicle speed, in which said relationship corresponds with any work mode selected from said plurality of ones.

5. The working vehicle according to any one of claims 1 to 4, wherein said automatic transmission is a continuously variable transmission comprising a primary pulley for inputting a rotation of the engine, a secondary pulley for outputting the rotation to said wheels, and a belt for connecting between the primary pulley and the secondary pulley.

6. The working vehicle according to claim 1, wherein said control unit controls the transmission ratio of said automatic transmission so as to enable the rotational speed of said drive unit to be substantially proportional to the vehicle speed in at least predetermined range of the vehicle speed.

* * * * *